(12) United States Patent
Garceau (10) Patent No.: US 9,995,376 B2
(45) Date of Patent: Jun. 12, 2018

(54) SLIDE OUT DRIVE ASSEMBLY FOR ENCLOSURE

(71) Applicant: NORCO INDUSTRIES, INC., Compton, CA (US)

(72) Inventor: Bernard F. Garceau, Vandalia, MI (US)

(73) Assignee: NORCO INDUSTRIES, INC., Compton, CA (US)

( * ) Notice: Subject to any disclaimer, the term of this patent is extended or adjusted under 35 U.S.C. 154(b) by 0 days. days.

(21) Appl. No.: 15/384,505

(22) Filed: Dec. 20, 2016

(65) Prior Publication Data

US 2017/0102054 A1    Apr. 13, 2017

Related U.S. Application Data (63) Continuation of application No. 14/603,674, filed on Jan. 23, 2015, now Pat. No. 9,556,940, which is a continuation of application No. 13/294,822, filed on Nov. 11, 2011, now Pat. No. 8,967,694.

(51) Int. Cl.
- *F16H 19/04* (2006.01)
- *B60P 3/34* (2006.01)
- *F16H 55/26* (2006.01)

(52) U.S. Cl.
CPC ............... *F16H 19/04* (2013.01); *B60P 3/34* (2013.01); *F16H 55/26* (2013.01)

(58) Field of Classification Search
CPC . F16H 19/04; F16H 55/26; B60P 3/34; Y10T 74/19963; Y10T 29/49622; Y10T 29/49616; Y10T 74/18808

USPC ............... 296/165, 171, 173, 26.09, 26.13; 29/897.2

See application file for complete search history.

(56) References Cited

U.S. PATENT DOCUMENTS

| | | | |
|---|---|---|---|
| 1,972,415 A | 9/1934 | Anderson | |
| 2,739,833 A | 3/1956 | Schenkel et al. | |
| 2,744,781 A | 5/1956 | Black | |
| 2,842,972 A * | 7/1958 | Houdart | B60P 3/34 254/97 |
| 2,857,197 A | 10/1958 | Hogg | |
| 2,877,509 A | 3/1959 | Klibanow | |
| 2,898,143 A | 8/1959 | Ferrera | |

(Continued)

FOREIGN PATENT DOCUMENTS

| | | |
|---|---|---|
| BE | 523151 | 10/1953 |
| CA | 2136673 A1 | 3/1996 |

(Continued)

*Primary Examiner* — Jason S Morrow
*Assistant Examiner* — E Turner Hicks
(74) *Attorney, Agent, or Firm* — Vorys, Sater, Seymour and Pease LLP; Mark A. Watkins (57) ABSTRACT

A drive assembly for a slide out in an expandable enclosure, the drive assembly comprising a beam attachable to the slide out, the beam having a first row of teeth and a second row of teeth thereon, the first row of teeth and the second row of teeth extending parallel to each other on opposite sides of the beam wherein the teeth in the first row of teeth are offset relative to the teeth in the second row of teeth and a drive gear having a first gear wheel engagable with the first row of teeth and a second gear wheel engagable with the second row of teeth, and an actuator coupled to the beam to selectively extend and retract the beam.

11 Claims, 9 Drawing Sheets

(56) References Cited

U.S. PATENT DOCUMENTS

| | | |
|---|---|---|
| 2,898,144 A | 8/1959 | Ferrera |
| 2,902,312 A | 9/1959 | Ferrera |
| 2,965,412 A | 12/1960 | Henderson et al. |
| 3,137,041 A | 6/1964 | Mullen |
| 3,341,986 A | 9/1967 | Brosig |
| 3,692,349 A | 9/1972 | Ehrlich |
| 3,712,005 A | 1/1973 | Eschbach et al. |
| 4,066,356 A * | 1/1978 | Parker ................. G03B 27/56 355/63 |
| 4,103,462 A | 8/1978 | Freller |
| 4,261,614 A | 4/1981 | Rice |
| 4,270,791 A | 6/1981 | Tann |
| 5,050,927 A | 9/1991 | Montanari |
| 5,090,749 A | 2/1992 | Lee |
| 5,237,782 A | 8/1993 | Cooper |
| 5,248,180 A | 9/1993 | Hussaini |
| 5,295,430 A | 3/1994 | Dewald, Jr. et al. |
| 5,332,276 A | 7/1994 | Blodgett, Jr. |
| 5,491,933 A | 2/1996 | Miller et al. |
| 5,530,323 A | 6/1996 | Breitzmann |
| 5,570,924 A | 11/1996 | Few et al. |
| 5,634,683 A | 6/1997 | Young |
| 5,706,612 A | 1/1998 | Tillett |
| 5,758,918 A | 6/1998 | Schneider et al. |
| 5,791,715 A | 8/1998 | Nebel |
| 5,800,002 A | 9/1998 | Tiedge et al. |
| 5,857,733 A | 1/1999 | Dewald, Jr. et al. |
| 5,860,693 A | 1/1999 | Ehrlich |
| 5,894,698 A | 4/1999 | Dewald, Jr. et al. |
| 5,915,774 A | 6/1999 | Tiedge |
| 5,971,471 A | 10/1999 | Gardner |
| 6,094,870 A | 9/2000 | Stacy |
| 6,116,671 A | 9/2000 | Schneider |
| 6,152,520 A | 11/2000 | Gardner |
| 6,227,607 B1 | 5/2001 | Dewald, Jr. et al. |
| 6,234,566 B1 | 5/2001 | Cyr et al. |
| 6,254,171 B1 | 7/2001 | Young, Sr. |
| 6,293,611 B1 | 9/2001 | Schneider et al. |
| 6,325,437 B2 | 12/2001 | Heibert et al. |
| 6,338,523 B1 * | 1/2002 | Rasmussen ............. B60P 3/34 296/175 |
| 6,345,854 B1 | 2/2002 | McManus |
| 6,393,769 B1 | 5/2002 | Mertik et al. |
| 6,415,675 B1 | 7/2002 | Schneider et al. |
| 6,422,628 B1 | 7/2002 | Bortell |
| 6,454,336 B1 | 9/2002 | Nye et al. |
| 6,471,275 B1 | 10/2002 | Kunz et al. |
| 6,502,893 B1 | 1/2003 | Corliss, Jr. |
| 6,536,821 B1 | 3/2003 | Gardner |
| 6,568,734 B2 | 5/2003 | Buls et al. |
| 6,619,713 B2 | 9/2003 | Eichhorn |
| 6,619,714 B2 | 9/2003 | Schneider et al. |
| 6,623,066 B2 | 9/2003 | Garceau et al. |
| 6,644,719 B2 | 11/2003 | Young, Sr. |
| 6,696,813 B2 | 2/2004 | McManus et al. |
| 6,729,670 B1 | 5/2004 | Buls et al. |
| 6,783,164 B2 | 8/2004 | Bortell |
| 6,796,590 B2 | 9/2004 | Schneider |
| 6,896,307 B2 | 5/2005 | Nye et al. |
| 6,905,154 B1 | 6/2005 | Buls et al. |
| 6,976,721 B2 | 12/2005 | Rasmussen |
| 6,981,728 B2 | 1/2006 | Rasmussen |
| 7,040,689 B2 | 5/2006 | Few et al. |
| 7,052,064 B2 | 5/2006 | Rasmussen |
| 7,052,065 B2 | 5/2006 | Rasmussen |
| 7,073,844 B2 | 7/2006 | Garceau et al. |
| 7,108,005 B1 | 9/2006 | Christenson et al. |
| 7,150,483 B2 | 12/2006 | Rasmussen |
| 7,198,320 B2 | 4/2007 | Rasmussen |
| 7,210,269 B2 | 5/2007 | Garceau et al. |
| 7,234,747 B2 | 6/2007 | Rasmussen |
| 7,258,389 B2 | 8/2007 | Franzini |
| 7,309,092 B2 | 12/2007 | Garceau et al. |
| 7,350,850 B2 | 4/2008 | Rasmussen |
| 7,354,088 B2 | 4/2008 | Garceau et al. |
| 7,374,218 B2 | 5/2008 | Schneider |
| 7,384,093 B2 | 6/2008 | Rasmussen |
| 7,588,279 B2 | 9/2009 | Rasmussen |
| 7,607,365 B1 * | 10/2009 | Courser ................. B60P 3/34 296/171 |
| 7,748,763 B2 | 7/2010 | MacLean |
| 7,871,114 B2 | 1/2011 | Schultz et al. |
| 8,967,694 B2 | 3/2015 | Garceau |
| 2002/0063441 A1 | 5/2002 | Young, Sr. |
| 2002/0074815 A1 | 6/2002 | McManus et al. |
| 2002/0084664 A1 * | 7/2002 | McManus ............. B60P 3/34 296/26.13 |
| 2002/0089212 A1 | 7/2002 | Garceau et al. |
| 2003/0205911 A1 * | 11/2003 | Schneider ............. B60P 3/34 296/175 |
| 2004/0094983 A1 | 5/2004 | Bortell |
| 2004/0145204 A1 | 7/2004 | Few et al. |
| 2005/0179278 A1 * | 8/2005 | Yoder ................. B60P 3/34 296/26.13 |
| 2005/0230989 A1 | 10/2005 | Nebel |
| 2006/0131912 A1 * | 6/2006 | MacLean ............. B60P 3/34 296/26.13 |
| 2006/0186683 A1 | 8/2006 | Garceau |
| 2007/0194586 A1 | 8/2007 | Gardner |
| 2007/0216183 A1 | 9/2007 | Few et al. |
| 2008/0284191 A1 * | 11/2008 | Schultz ................. B60P 3/34 296/26.13 |
| 2008/0290689 A1 | 11/2008 | Garceau |
| 2009/0261610 A1 | 10/2009 | Kreil |
| 2010/0066025 A1 | 3/2010 | Kreil |
| 2011/0025091 A1 | 2/2011 | Schwindaman et al. |

FOREIGN PATENT DOCUMENTS

| | | |
|---|---|---|
| CA | 2371302 A1 | 11/2000 |
| CA | 2488352 A1 | 5/2005 |
| DE | 1095137 B | 12/1960 |
| EP | 1173346 A1 | 1/2002 |
| GB | 882258 A | 11/1961 |

* cited by examiner

SLIDE OUT DRIVE ASSEMBLY FOR ENCLOSURE

CROSS-REFERENCE TO RELATED APPLICATIONS

This application is a continuation of U.S. patent application Ser. No. 14/603,674, filed Jan. 23, 2015, which is a continuation of U.S. patent application Ser. No. 13/294,822, filed Nov. 11, 2011, now issued as U.S. Pat. No. 8,967,694, the complete disclosures of which are incorporated herein by reference.

TECHNICAL FIELD

This invention relates generally to an enclosure having one or more slide outs used to reconfigure the enclosure. More particularly, the invention relates to an enclosure having at least one slide out that may be extended to alter the configuration of the enclosure and/or provide more room within the enclosure. Most particularly, the invention relates to a drive assembly having a rack and pinion drive used to extend or retract the slide out.

BACKGROUND OF THE INVENTION

Expandable enclosures are often used in connection with recreational vehicles or trailers that have portions that extend and retract to allow the enclosure to be transported in a compact configuration and extended to a more spacious configuration when stationary. To that end, these recreation vehicles and trailers are provided with slide outs including slidable rooms and other structures that increase or reconfigure the usable space. Existing slidable rooms and other slide outs may be time consuming to install and their operating mechanisms may include components that add a great deal of weight and complexity to the enclosure. Since most enclosures having slide outs are used in applications where they need to be transported, it is desirable to reduce the weight of the enclosure as practically as possible. Likewise, reducing the complexity of the slide out drive assembly is desirable in terms of the labor needed to install the drive assembly and operation of the drive assembly by the user.

SUMMARY OF THE INVENTION

In one embodiment, a drive assembly for an expandable enclosure includes a beam having a first row of teeth and a second row of teeth thereon, the first row of teeth and the second row of teeth extending parallel to each other on opposite sides of the beam. The teeth in the first row of teeth are offset relative to the teeth in the second row of teeth. The drive gear has a first gear wheel engagable with the first row of teeth and the second gear wheel engagable with the second row of teeth.

In another embodiment, a rack used in connection a drive assembly for an expandable enclosure includes a beam having a pair of laterally extending flanges, each flange having a row of teeth stamped therein.

In another embodiment, an expandable enclosure includes an enclosure having a side, a slide out portion formed in the side and extendable therefrom. The enclosure further includes a drive assembly including a beam having a first row of teeth and a second row of teeth extending parallel to each other and laterally spaced from each other by a central portion. The beam is configured to attach to the slide out portion. The drive assembly also includes a drive gear assembly having a first gear wheel and a second gear wheel respectively engagable with the first row of teeth and the second row of teeth, and a support wheel located between the first gear wheel and the second gear wheel. The support wheel is configured to contact the beam between the first row of teeth and the second row of teeth.

A method of constructing a beam in a drive assembly for a slide out, providing a die that stamps plural members having an upright section and a laterally extending flange, the laterally extending flange having a row of teeth formed therein, wherein the row of teeth extends less than the full length of the member, wherein each member produced by the die has a first end and a second end, aligning a first member with upright portions of each member adjacent to each other, and joining the upright sections of the first and second members to form the beam with the two rows of teeth located on the flanges extending laterally outward from the joined upright sections.

DETAILED DESCRIPTION OF THE INVENTION

An "enclosure" as used herein may include any partially or completely enclosed space. The enclosure may be stationary or mobile. Mobile enclosures may be self-powered or towable, and include but are not limited to mobile homes, recreational vehicles, and trailers. The term "expandable enclosure" refers to an enclosure that has the ability to alter its configuration and in some cases create more interior space. For example, an expandable enclosure may include one or more portions that extend and retract to selectively reconfigure the space defined by the enclosure. These portions are often referred to as "slide outs" or "slideable rooms." A slide out may include a portion that is moved relative to the enclosure to change the configuration of the enclosure including but not limited to increasing the space available within the enclosure. Slide outs may be of various size and shape as required by a given enclosure. Also, slide outs may expand and retract in any known manner including, but not limited to pivoting and telescoping relative to the main portion of the enclosure. The example shown in the accompanying drawings, therefore, should not be considered limiting.

Figure 1:
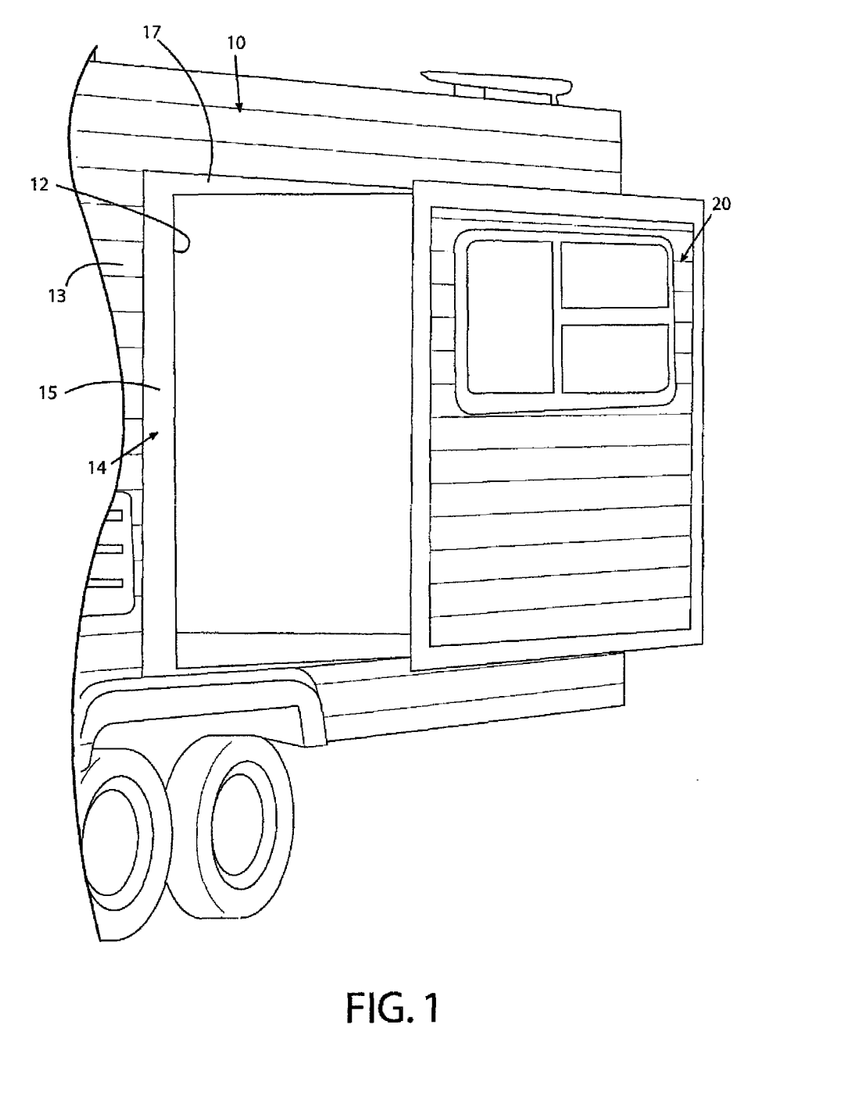
FIG. 1 is a perspective exterior view of a portion of an enclosure having a slide out according to the present invention, showing the slide out in an extended position.

FIG. 1 shows a portion of an enclosure 10 with a slide out 20 in an extended position. During movement or transport of the enclosure, the slide out 20 may be fully retracted to configure the enclosure 10 in a compact configuration. The enclosure has a wall 13 defining an opening 12 into which the slide out 20 fits. Positioned about the edges of the opening 12 is a frame 14. Frame 14 may include side jambs 15, a header 17, and a footer 19. In the example shown, the jambs 15, header 17, and floor 19 are linear and joined at right angles to define a rectangular opening 12. The slide out 20 may be extended or retracted within frame 14 to alter the configuration of enclosure 10 as needed. Optionally, a seal, such as a polymer strip may be provided about the frame 14 to provide a weather tight seal between the frame 14 and the slide out 20. Slide out 20 may be of any size or shape as required by a given application and may form a compartment, dinette, wardrobe, library, bedroom, closet, kitchen, etc.

Enclosure 10 may be a self powered vehicle, such as a recreational vehicle, or may be towable, such as a trailer. The enclosure 10 may be one that is designed for living or temporary accommodation or maybe a work vehicle such as a mobile classroom, library, or temporary office space. Alternatively, the enclosure 10 may be a stationary structure including but not limited to modular housing.

Figure 2:
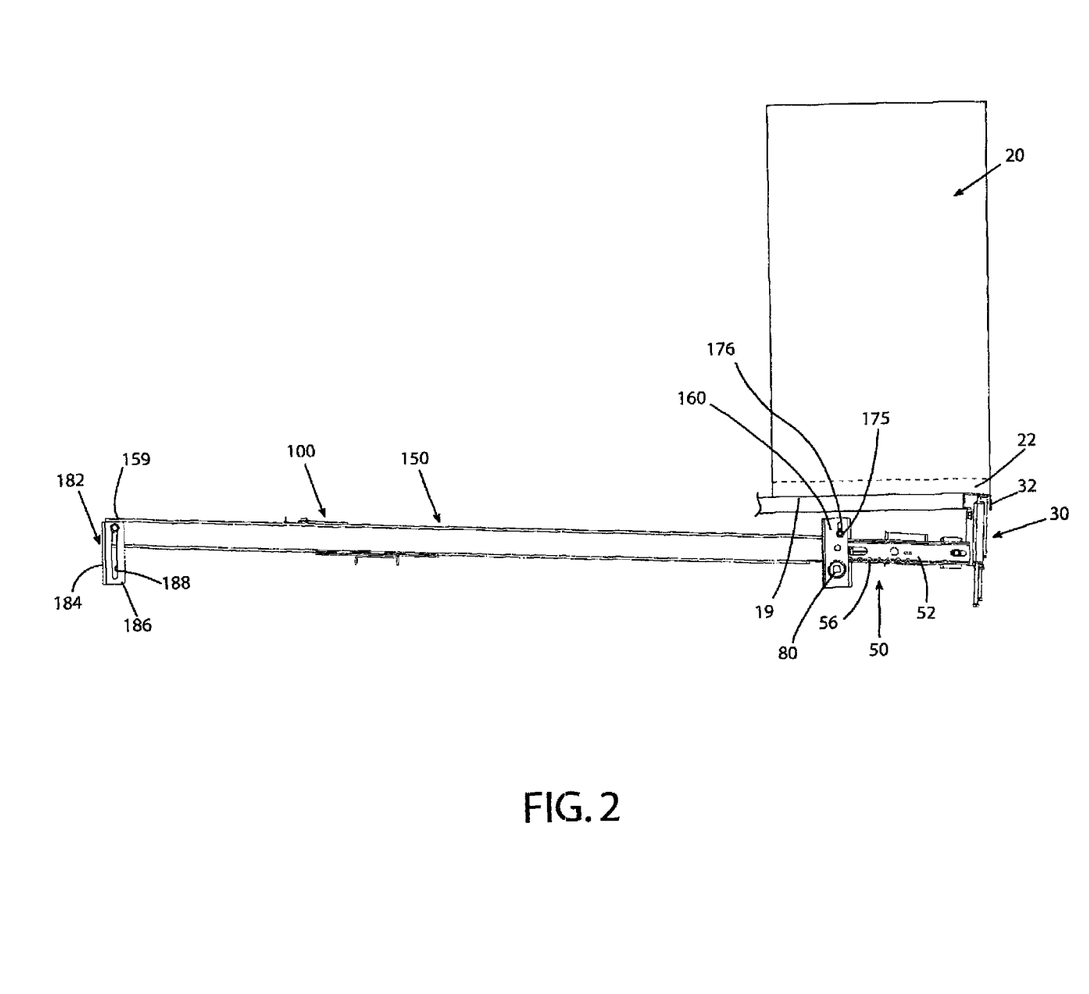
FIG. 2 is a side elevational view of drive assembly for a slide out according to the invention.

As shown in FIG. 2, a drive assembly, generally indicated by the number 50 may be mounted adjacent to the frame 14. In the example shown, drive assembly 50 is located on or below floor 19 of enclosure 10. Drive assembly 50 may include a beam 52 that attaches to slide out 20 or may form part of the frame of the slide out 20. In the example shown, an end bracket, generally indicated by the number 30 that attaches to a cross bar 32 that attaches to the floor 22 of slide out 20. Bracket 30 may have any shape or cross member 32 may attach directly to beam 52. In the example shown, bracket 30 includes a face plate 34 that attaches to beam 52 and to cross member or slide out 20 at its top section. To provide further support for slide out 20 in the extended position, bracket 30 may include a support 36 that extends downward to contact a supporting surface. In the example shown, a telescopic support extends downwardly from the end plate and has an end that may be rotating to release and extend the support downwardly to contact the supporting surface.

Figure 4:
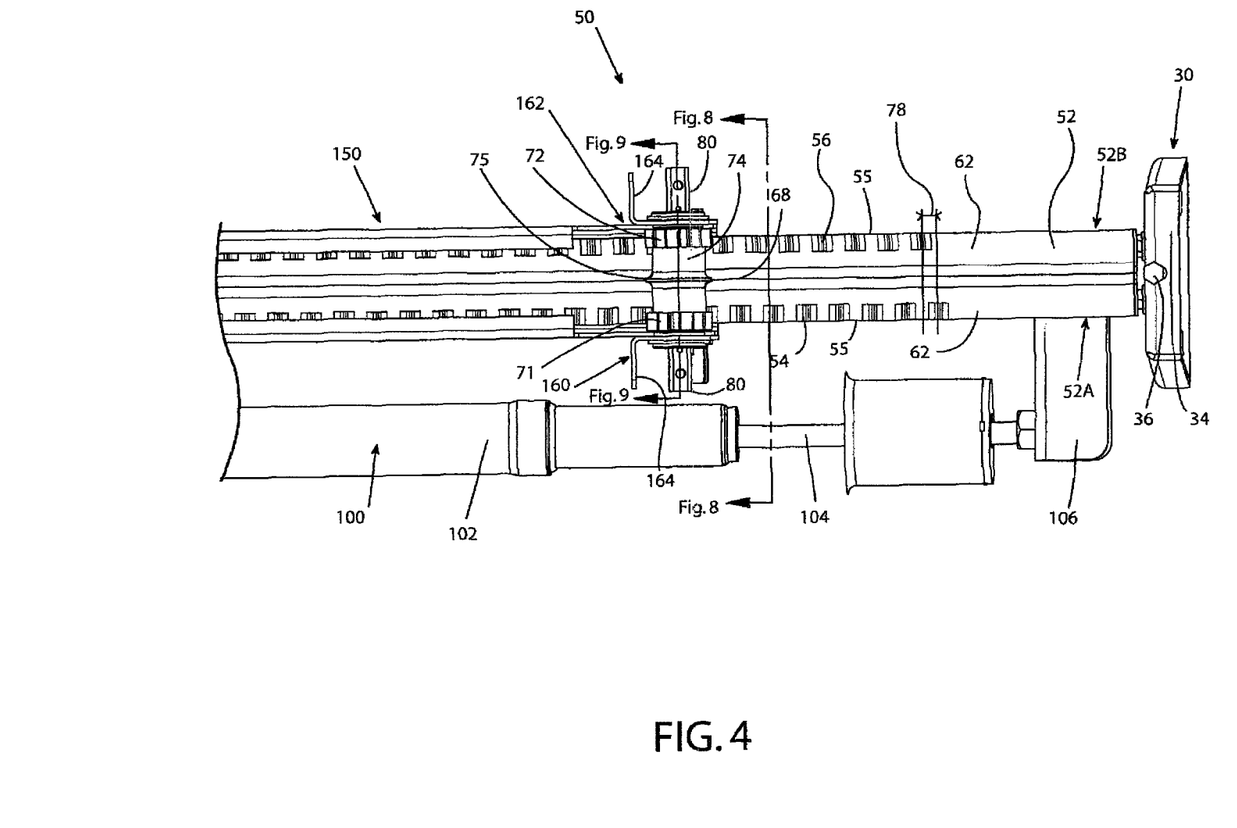
FIG. 4 is an enlarged bottom elevational view of a front portion of a drive assembly according to the invention.

Beam 52 is moveable between a retracted position and an extended position to selectively extend and retract a slide out 20. As best shown in FIG. 4, beam 52 includes a first row of teeth 54 and a second row of teeth 56 that are formed on opposite sides of the beam 52. The first row of teeth 54 and second row of teeth 56 extend parallel to each other and, as shown, may be formed on respective flanges on either side of the beam 52. Teeth 54,56 may be formed in any known manner. For example, the rows of teeth 54,56 may be stamped into beam 52. The beam 52 may be a monolithic member or be formed by multiple pieces.

According to one embodiment of the invention, beam 52 is formed by a pair of c-shaped members 60 having a vertical center section 66 and outwardly extending bottom and top flanges 62,64. These c-shaped members are joined at the center sections and form a central channel or groove 68 where the sections are joined together. In the example shown, the rows of teeth are stamped into the bottom flange 62 on each c-shape member such that the rows of teeth 54,56 are located on either side of the groove 68.

Figure 9:
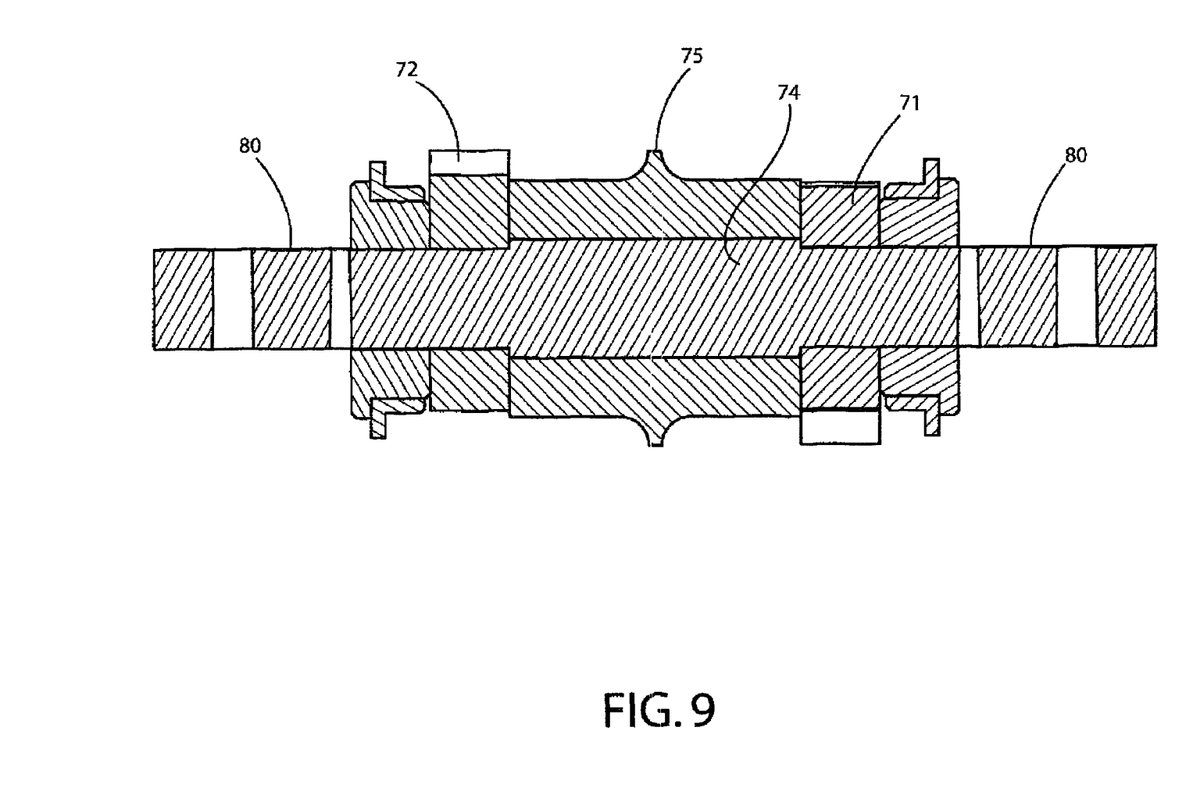
FIG. 9 is a sectional view as might be seen along line 9-9 in FIG. 4 showing details of a drive gear assembly according to the invention.

A drive gear assembly, generally indicated by the number 70, is configured to engage the first and second rows of teeth 54,56. Drive gear assembly 70 may include a first gear wheel 71 and a second gear wheel 72 that engage respective rows of teeth. The drive gear assembly 70 may further include a support wheel 75 that engages beam 52 between the first and second rows of gear teeth 54,56 to allow free movement of beam 52 in the axial direction. Support wheel 75, first gear wheel 71, and a second gear wheel 72 may all be mounted on a common hub 74 (FIG. 9). The support wheel 75 may optionally be mounted on suitable bearings such that it rotates independently of hub 74. In the example shown, support wheel 75 is fixed to hub 74 and rotates with first and second gear wheels 54,56.

The first row of teeth and second row of teeth 54,56 may be symmetrical about the center line of beam 52. Optionally, as shown, the first row of gear teeth and second row of gear teeth 54,56 may have an offset 78 in the axial direction. The offset 78 may be any amount. For example, the offset 78 shown is one and a half teeth. This offset ensures that at least one tooth on each wheel is engaged at all times to help spread the load of slide out 20. Likewise, the first gear wheel and second gear wheel 71,72 may be mounted in a corresponding rotationally offset positions to mate with the offset rows of gear teeth 54,56. In this way, greater stability is provided by maintaining contact with more than one gear tooth on either side of the beam 52 at all times.

According to another aspect of the invention, a method of forming beam 52 includes stamping a c-shaped member having a first end and a second end. Stamping a second c-shaped member having a first end and a second end in the same die. Each c-shaped member has a row of teeth formed on a bottom flange. The teeth formed on the flange to a tooth on a gear wheel. The spacing of the teeth on gear wheels 71,72 and on rows 54,56 may be set such that the cogs on gear wheels 71,72 contact the teeth in rows 54,56 in alternating fashion. An offset between rows 54,56 may be provided to time contact of the teeth in this alternating fashion.

Figure 3:
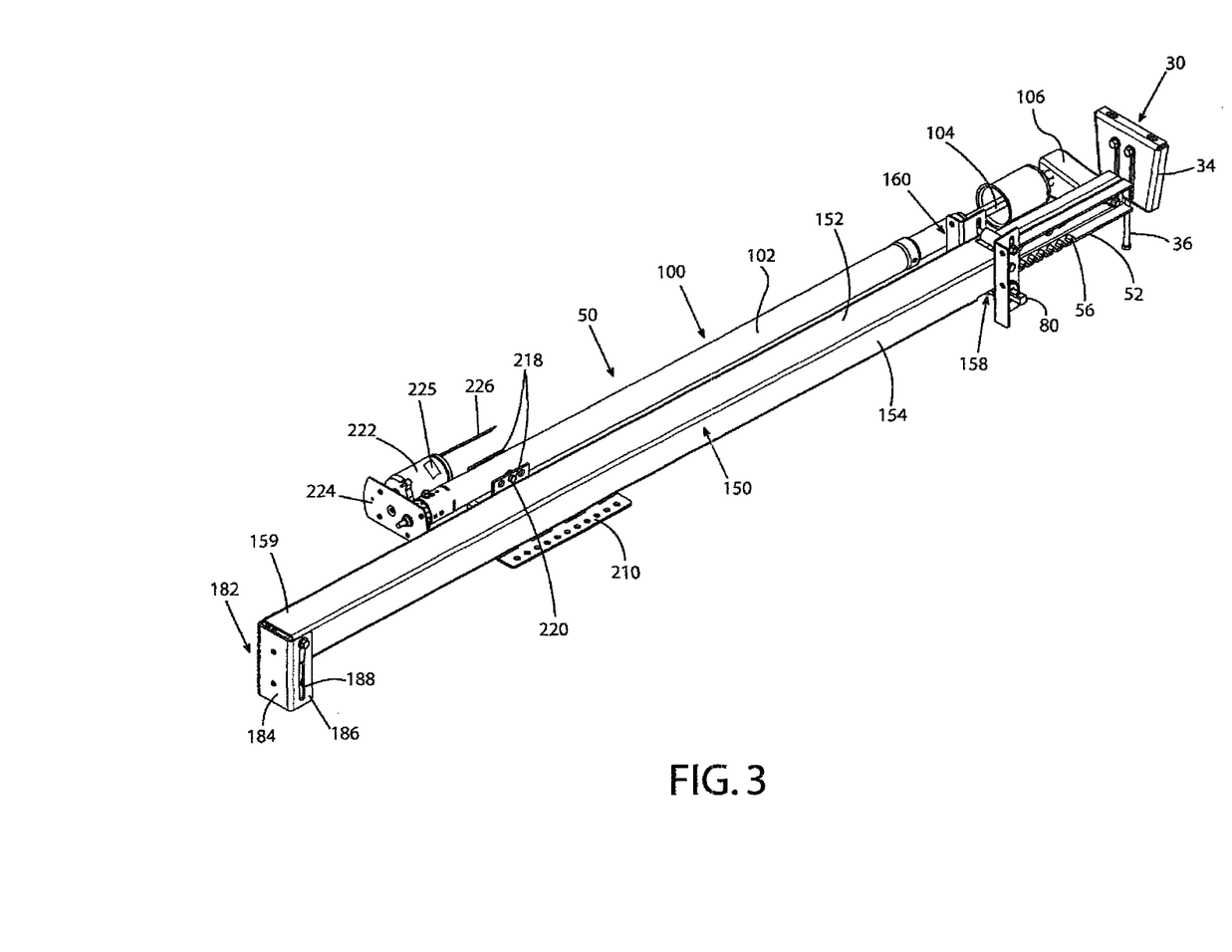
FIG. 3 is a top perspective view of a drive assembly according to the invention.
Figure 5:
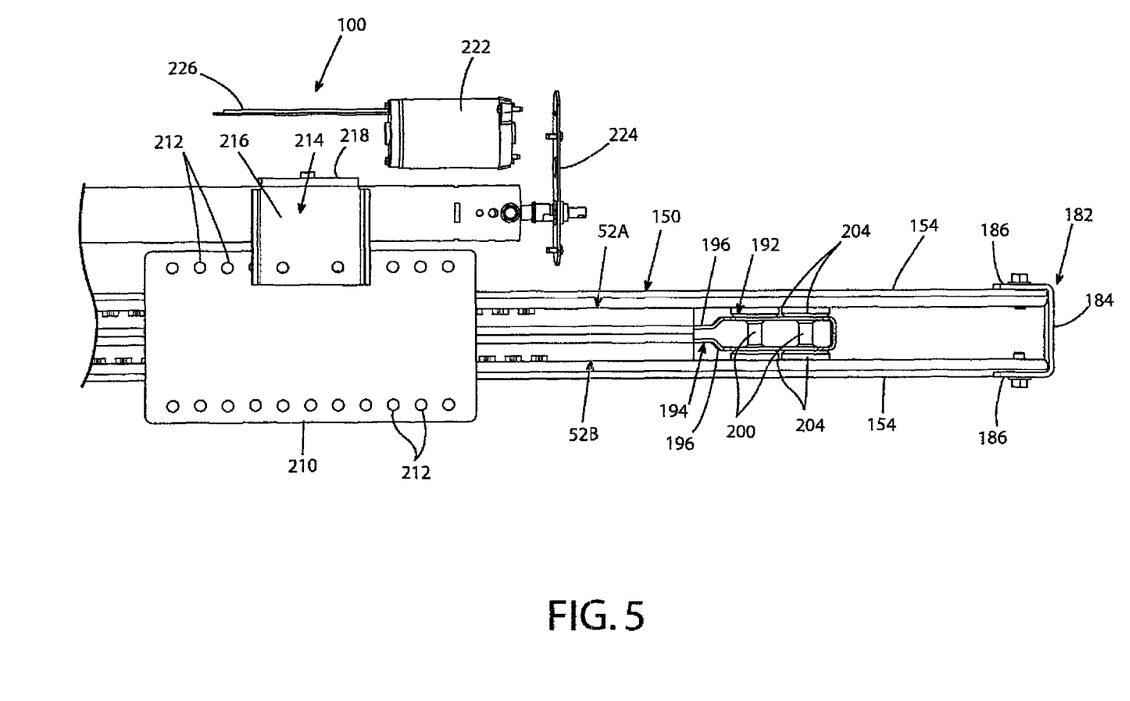
FIG. 5 is an enlarged bottom elevational view showing a rear portion of a drive assembly according to the invention.

As best shown in FIGS. 3 and 4, the teeth in one row begin before the teeth in the opposite row and the teeth are spaced by an offset 78. According to one aspect of the invention a method of forming the offset teeth in a single die is provided. A single die is provided to mold or stamp one half of beam 52. The mold creates a first beam member 52A having a row of teeth 54 that start a first distance from a first end (FIG. 4) of first beam member and terminate a second distance from the second end (FIG. 5) of the first beam member. The first and second distances are not equal and differ by the amount of the desired offset 78 between the rows of teeth. That way, when a second beam member 50B is provided by the die, the second beam member may be rotated and joined to the first beam member to create the second row of teeth 56 with the desired offset 78 between the first and second rows of teeth 54,56.

In the example shown, beam is constructed by a pair of c-shaped beam members having rows of teeth 54,56 formed as described above. In particular, the first c-shaped member having a first row of teeth 54 is provided, and then a second c-shaped member is placed adjacent such that its second end is adjacent to the first end of the first c-shaped member. In other words, one of the c-shaped members is flipped around and placed back to back with the other c-shaped member. Once in this configuration, the c-shaped members may be fastened or welded together to form beam 52. The fact that the rows of teeth 54,56 each have a tooth profile that corresponds to every other tooth on a gear wheel, and the offset 78 between the rows of teeth causes alternating engagement of the teeth 54,56 by corresponding gear wheels 71,72. In other words, as the first gear wheel 71 moves toward disengagement the tooth on second gear wheel 72 is beginning to engage the second row of teeth 56.

Figure 7:
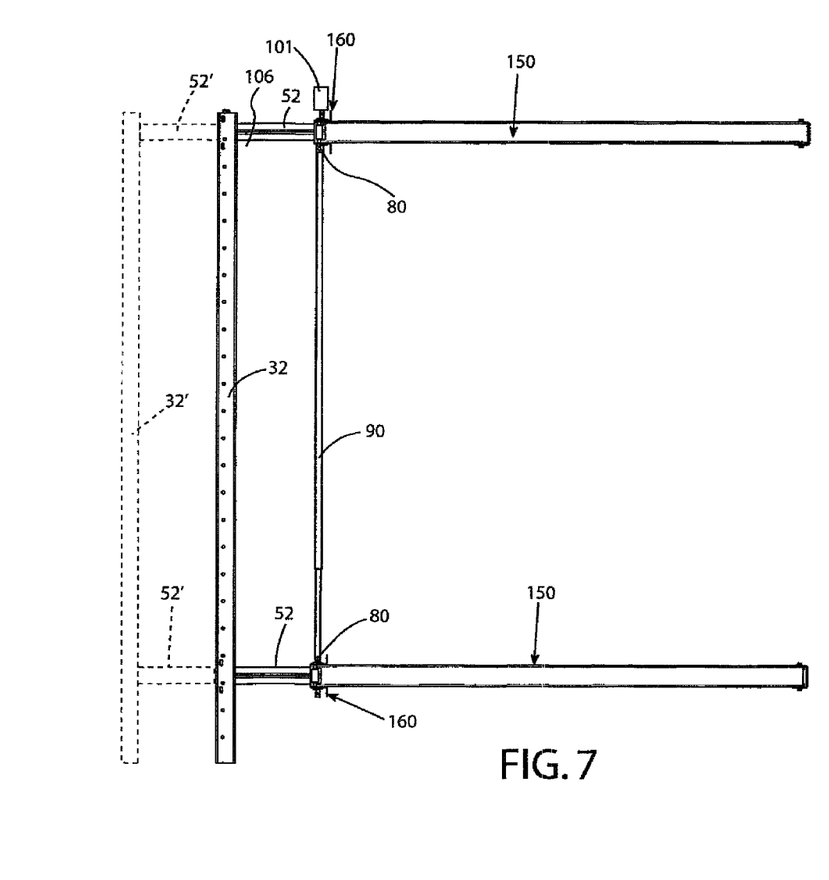
FIG. 7 is a top plan view of the drive assembly shown in FIG. 6 with the drive assembly shown in an extended position in dashed lines.

As best shown in FIGS. 4 and 9, a stub shaft 80 may extend axially outward from hub 74 and is connected to hub 74 such that rotation of stub shaft 80 causes the first and second gear wheels 71,72 to rotate and drive beam 52. The stub shaft 80 may be manually rotated with an appropriate tool or driven by a motor. As shown in FIG. 7, a motor 101 may be coupled to stub shaft 80 a drive assembly 50. A motor 101 may be provided for each drive assembly, when using more than one drive assembly, or, as shown, stub shaft 80 may also be used to link and synchronize multiple drive assemblies 50. There, a tandem drive assembly is shown having two drive assemblies 50 linked by a cross member 90 that couples stub shafts 80 extending from each hub 74. Cross member 90 may be any suitable coupler including but not limited to a telescoping square cross-sectioned tube as shown. In the example shown, tube is extended to fit over a stub shaft 80 on each drive assembly 50 and pinned in place. In this example motor 101 drives both drive assemblies 50 via cross member 90.

Figure 6:
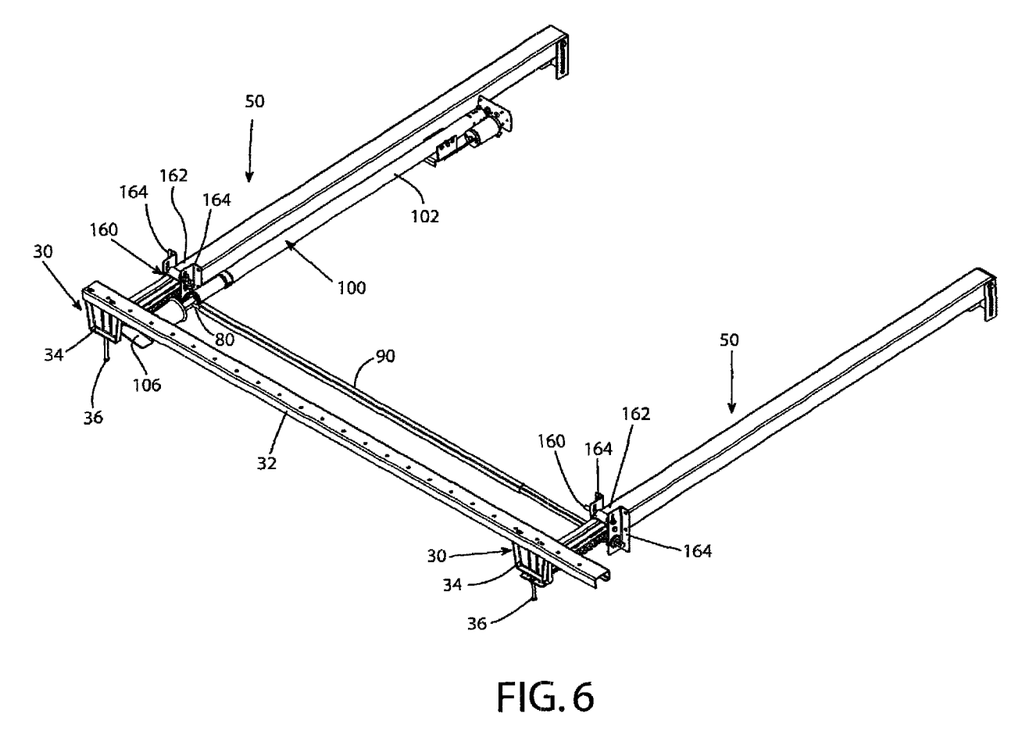
FIG. 6 is a top perspective view of a drive assembly according to another embodiment of the invention having two drive assemblies connected by a cross-member.

By coupling drive assemblies 50, a pair of beams 52 may be used to extend and retract slide out 20 through a common actuator 100. Actuator 100 may be a motor 101 (FIG. 7) coupled to drive assembly 50 or an electric, hydraulic, or pneumatic cylinder that is coupled to a portion of drive assembly 50 to cause the beam 52 to extend and retract. In the example shown, in FIGS. 3 and 6, an electric cylinder 102 is used and has a telescoping rod 104 that attaches to an actuator bracket 106 that is coupled to beam 52 through end plate 34. In the embodiment shown in FIG. 6, the actuator 100 drives one beam 52, which in turn causes the gear wheels 71,72 to rotate on teeth 54,56. Rotation of gear wheels 71,72 rotates hub 74 and stub shaft 80, which is coupled by cross member 90 to the hub 74 of opposite beam 52. Rotation of opposite hub 74, in turn, rotates gear wheels 71,72 on that hub to drive second beam 52 at the same time first beam 52 is driven by actuator 100. FIG. 6 depicts extension of the drive assemblies to move the slide out to an extended position as shown in FIG. 1. The extended position is shown in dashed lines with the reference numerals indicated, with a prime (marking). In particular, as shown, in the extended position, actuator 100 drives beams 52 outwardly along with the cross member 32 that attaches to the slide out 20 to the extended position 52 prime, 32 prime.

Figure 8:
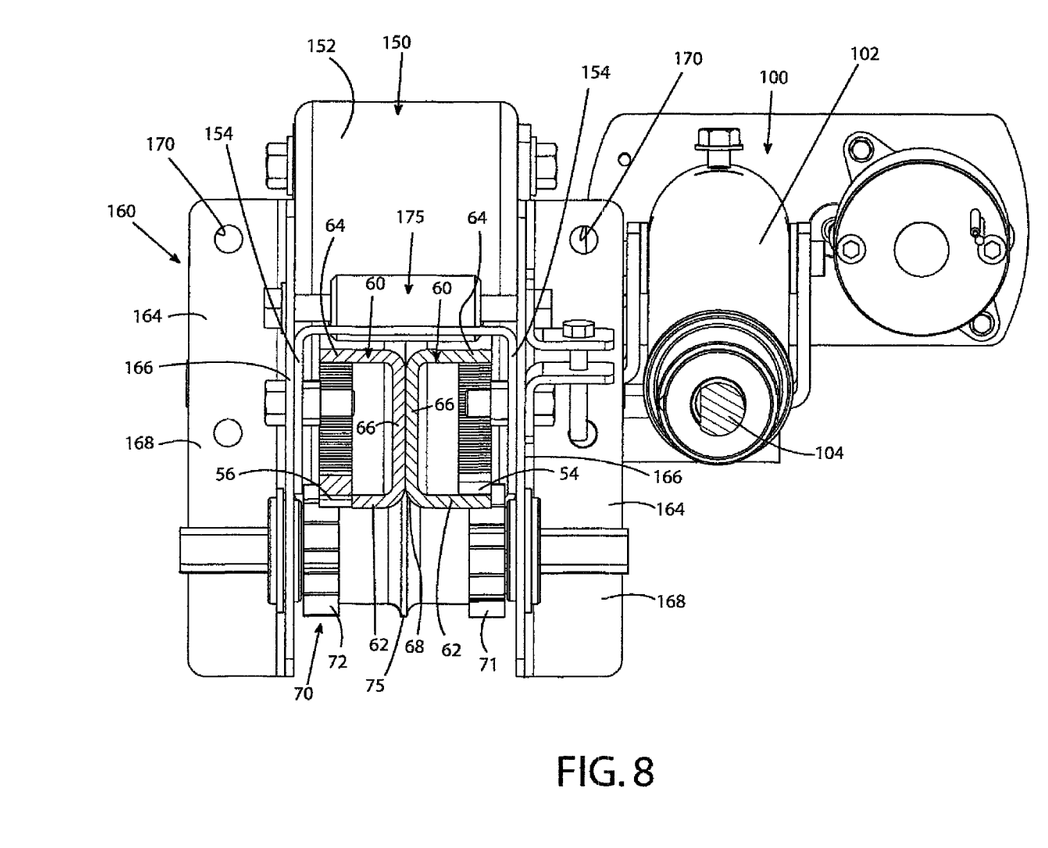
FIG. 8 is a partially sectioned front elevational view of the drive assembly depicted in FIG. 4.

The drive assembly may be mounted beneath the body of the enclosure 10 or within the sub frame of the enclosure 10. Other locations may be used depending on the orientation of the drive assembly. In the example shown, a pair of substantially parallel support rails 150 are provided to house and support beams 52. As shown, each support rail 150 has a channel-like configuration with a closed top wall 152 and downwardly extending side walls 154. The bottom section 155 is partially closed by a pair of lower flanges 156 that extend inwardly toward each other. As best shown in FIG. 4, lower flanges 156 may extend inward an extent to support the edges 55 of beam 52. As shown in FIG. 3, lower flanges 156 may not extend the entire length of support rail 150 providing clearance 158 for gear wheels 71, 72 at the mouth of rail 150. Support rails 150 may be attached to the frame of the enclosure 10 at either end. In the example shown, a hanger 160 is provided at the outer end 162 of each rail 150. The hangers 160 may be any structural member including a pair of L-shaped angle brackets 164 as shown. In the example shown, a first leg 166 of hanger 160 extends parallel to the support rail 150 and is bolted to the sidewall 154 of the support rail 150 (FIG. 8). The second leg 168, which is generally at a ninety degree angle to the first leg 166 includes an opening 170 for mounting hanger 160 to the frame of the enclosure N. A roller 175 may be supported on hanger 160 at the mouth of support rail 150. As best shown in FIG. 2, roller 175 may be mounted on a shaft that is supported in a slotted receiver 176 that allows roller to travel vertically to avoid binding of beam 52 as it extends outward from support rail 150. Hanger 160 may also support a bearing 180 that rotatably supports hub 74. As best shown in FIG. 9, stub shafts 80 may form part of hub 74 with stub shafts 80 being rotatably supported in bearings 180 on either side of hub 74.

At the rear portion of support rail 150, a second hanger 182 is provided to support the rear end 159 of support rail 150 in the example shown, a single hanger having a u-shaped cross-section is provided with a closed rear wall 184 and a pair of forwardly extending tabs 186. The rear wall 184 is provided with openings 188 that receive fasteners 190 to attached second hanger 182 to the frame of enclosure 10. In the example shown, a slotted opening 188 is provided on each tab 186 and extends vertically to allow adjustment of the height of second end 159 of support rail 150. This provides an adjustment to facilitate attachment of beam 52 to enclosure or to allow beam 52 to be used in a flush floor slide out. For example, as best seen in FIG. 2, second end 159 may be raised to orient support rail 150 at a downward angle to position the floor of slide out 20 flush with the floor of the enclosure 10. In particular, when the slide out 20 is fully extended, the downward angle of support rail 150 and beam 52 allow the slide out 20 to drop down so that its floor is flush with the floor of the enclosure. In other applications, support rail 150 may be oriented in a level position or at an upward angle.

Each support rail 150 defines a channel 151 that receives beam 52 and supports beam 52 as it extends and retracts. A stop 192 may be provided at a rear portion of the channel 151 to adjust the length of the channel 151 when using beams 52 of different lengths depending on the amount of extension required for a given slide out 20. The stop 192 may also be used to align beam 52 within the channel. In the example shown, stop 192 includes a yoke 194 having a pair of forwardly extending arms 196 defining a gap 198 there between in which the center portion 66 of beam 52 is received. Stop 192 may include one or more cross bars 200 that support arms 196 and extend across the channel 151. As shown, cross bars 200 may be supported on rollers 204 received within each sidewall 154 of the support rail.

As discussed previously, drive assembly 50 may include an electric cylinder used to extend and retract beam 52 from support rail 150. Cylinder 102 extends parallel to beam 52 and may be supported on support rail 150, as shown. It will be appreciated that cylinder 102 may be supported on the frame of enclosure 10 or another structure as well. In the depicted example, a mounting plate 210 is attached to the support rail, as by welds. The mounting plate 210 is provided with a number of mounting holes 212 on either side to allow attachment of a cylinder bracket 214. As shown, holes 212 may be provided on both sides of mounting plate 210 to allow attachment of cylinder 102 on either side of support rail 150 depending on the location of the slide out 20. The provision of multiple mounting holes also provides flexibility for positioning the cylinder 102.

Cylinder bracket 214 may have any configuration suited for a given cylinder 102. In the example shown, cylinder bracket 214 is generally an L-shaped member with a lower leg 216 attaching to the mounting plate 210 and a pair of upstanding legs 218 that extend upward adjacent to support rail 150. In the example shown, cylinder 102 is supported between the upstanding legs 218 and secured by a suitable fastener 220. A motor 222 is coupled to electronic cylinder 102 and may be supported on an end plate 224 extending from one end of cylinder 102. Motor 222 may include an internal controller 225 that controls operation of motor 222. In addition, for remote operation, motor 222 may include an antenna 226. The user may operate motor 222, through a switch located within enclosure 10 to selectively extend and retract slide out 20. For example, motor 222 is operated in one rotational direction to extend end 104 of cylinder 102 to extend slide out 20, and rotated in the opposite direction to retract end 104 and slide out 20.

The invention claimed is:

1. A slideout assembly in an expandable enclosure, the slideout assembly comprising:
    a first drive assembly comprising a beam attachable to the slide out, a drive gear, and an actuator,
        the beam having a first row of teeth extending along on a first side of the beam and a second row of teeth extending along an opposing second side of the beam, the first row of teeth and the second row of teeth extending parallel to each other on the opposing first and second sides of the beam, wherein the teeth in the first row of teeth are offset relative to the teeth in the second row of teeth,
        the drive gear having a first gear wheel engagable with the first row of teeth and a second gear wheel engagable with the second row of teeth, the first gear wheel and the second gear wheel being mounted on a drive gear hub that comprises a stub shaft extending axially outward therefrom, and
        the actuator coupled to the beam to selectively extend and retract the beam;
    at least a second drive assembly comprising a beam attachable to the slide out and a drive gear,
        the beam having a first row of teeth extending along on a first side of the beam and a second row of teeth extending along an opposing second side of the beam, the first row of teeth and the second row of teeth extending parallel to each other on the opposing first and second sides of the beam, wherein the teeth in the first row of teeth are offset relative to the teeth in the second row of teeth, the first gear wheel and the second gear wheel being mounted on a drive gear hub that comprises a stub shaft extending axially outward therefrom, and
        the drive gear having a first gear wheel engagable with the first row of teeth and a second gear wheel engagable with the second row of teeth; and
    a cross member that couples the first drive assembly stub shaft to the at least second drive assembly stub shaft, wherein the first drive assembly actuator drives the at least second drive assembly.

2. The drive assembly of claim 1, wherein the drive gears comprise a support wheel located between the first and second gear wheels, the support wheel extending radially outward to contact the beam between the first row of gear teeth and the second row of gear teeth.

3. The drive assembly of claim 2, wherein each of the first drive assembly drive gear and at least second drive assembly drive gear further comprises a support wheel, wherein each support wheel is rotatably mounted on its respective hub.

4. The drive assembly of claim 1, wherein the first row of gear teeth and the second row of gear teeth are offset by one and one half teeth.

5. The drive assembly of claim 1, wherein the beam defines a groove between the first row of teeth and the second row of teeth, the groove extending parallel to the first row of teeth and the second row of teeth.

6. The drive assembly of claim 1, wherein the beam includes a pair of side flanges extending laterally outward from a central portion, wherein the first row of teeth is stamped into one of the flanges and the second row of teeth is stamped into the other of the flanges.

7. The drive assembly of claim 1, wherein the actuator includes a motor coupled to the first gear wheel and the second gear wheel.

8. The drive assembly of claim 1, wherein the actuator includes an electronic cylinder having an extendable end coupled to the beam.

9. The drive assembly of claim 1 further comprising a bracket mounted on an end of the beam, wherein the bracket attaches to the slide out.

10. The drive assembly of claim 1 wherein the cross member is a telescoping square cross-sectioned tube.

11. The drive assembly of claim 10, the telescoping square cross-sectioned tube further comprising a first end and a second end, wherein
    the first end extends over the stub shaft of the first drive assembly, and
    the second end extends over the stub shaft of the at least second drive assembly.

* * * * *